United States Patent
Zhang et al.

(10) Patent No.: US 9,203,952 B2
(45) Date of Patent: Dec. 1, 2015

(54) DETECTING FALSE ANSWER SUPERVISION

(75) Inventors: Shuping Zhang, Sudbury, MA (US); Manpreet Singh, Ellington, CT (US)

(73) Assignee: iBasis, Inc., Lexington, MA (US)

( * ) Notice: Subject to any disclaimer, the term of this patent is extended or adjusted under 35 U.S.C. 154(b) by 235 days.

(21) Appl. No.: 13/389,585

(22) PCT Filed: Aug. 6, 2010

(86) PCT No.: PCT/US2010/044725
§ 371 (c)(1),
(2), (4) Date: Feb. 8, 2012

(87) PCT Pub. No.: WO2011/019610
PCT Pub. Date: Feb. 17, 2011

(65) Prior Publication Data
US 2012/0140903 A1   Jun. 7, 2012

Related U.S. Application Data (63) Continuation of application No. 12/538,384, filed on Aug. 10, 2009, now abandoned.

(51) Int. Cl.
*H04M 15/00* (2006.01)
*H04M 3/22* (2006.01)
*H04L 12/24* (2006.01)

(52) U.S. Cl.
CPC ......... *H04M 3/2227* (2013.01); *H04L 41/5009* (2013.01); *H04L 41/5087* (2013.01)

(58) Field of Classification Search
USPC ....................................................... 379/189
See application file for complete search history.

(56) References Cited

U.S. PATENT DOCUMENTS

| | | | |
|---|---|---|---|
| 5,509,055 A * | 4/1996 | Ehrlich | H04M 3/36 379/111 |
| 5,878,130 A | 3/1999 | Andrews et al. | |
| 7,257,086 B2 | 8/2007 | Brown et al. | |
| 8,369,503 B2 * | 2/2013 | Dube | H04M 3/2281 379/114.14 |
| 2002/0013849 A1 | 1/2002 | Schweitzer et al. | |
| 2004/0023655 A1 | 2/2004 | Hoy et al. | |
| 2007/0008894 A1 * | 1/2007 | Lynch | H04L 12/2697 370/244 |
| 2008/0102851 A1 | 5/2008 | Bodnar | |

OTHER PUBLICATIONS

International Search Report and Written Opinion for PCT/US2010/0044725 dated Nov. 30, 2010.
U.S. Office Action, dated Dec. 6, 2011, for U.S. Appl. No. 12/538,384, filed Aug. 10, 2009, consisting of 8 pages.

* cited by examiner

*Primary Examiner* — Duc Nguyen
*Assistant Examiner* — Assad Mohammed
(74) *Attorney, Agent, or Firm* — Hamilton, Brook, Smith & Reynolds, P.C.

(57) ABSTRACT

A method and corresponding apparatus are provided to detect false answer supervision by determining false answer supervision as either as a function of a number of completed calls of short duration or as a function of a distribution of differences between timestamps of alert signals and timestamps of connect signals used to complete calls, detecting false answer supervision based on the indicator of false answer supervision determined by either functions separately or in combination, and affecting a decision in response to the detecting.

31 Claims, 7 Drawing Sheets

DETECTING FALSE ANSWER SUPERVISION

RELATED APPLICATION(S)

This application is the U.S. National Stage of International Application No. PCT/US2010/044725, filed Aug. 6, 2010, which designates the U.S., published in English, and which is a continuation of U.S. application Ser. No. 12/538,384 filed on Aug. 10, 2009 now abandoned. The entire teachings of the above applications are incorporated herein by reference.

BACKGROUND

Answer supervision occurs when a called party answers the phone, signifying it is time to start billing the call. Answer supervision may be delivered by a simple timer, voice detection or signaling to name a few example mechanisms. False answer supervision (FAS) occurs when a calling party is charged for a call that does not connect or the calling party is overbilled for a call that is actually shorter in duration than billed.

SUMMARY

An example embodiment of the present invention may be implemented in the form of a method or corresponding apparatus for detecting false answer supervision. The method and corresponding apparatus according to one embodiment of the present invention includes determining for each route an indicator of false answer supervision either as a function of a number of completed calls of short duration and a number of hangups or as a function of a distribution of differences between timestamps of alert signals and timestamps of connect signals used to complete calls. The embodiment detects false answer supervision for a subject route, based on the indicator of false answer supervision so determined by either functions separately or in combination. The embodiment in response to the detecting, affects a decision about the subject route.

Another embodiment determines the indicator of false answer supervision as a ratio of the number of completed calls of short duration to the number of hangups. False answer supervision is detected, in an event the ratio of the number of completed calls of short duration to the number of hangups is greater than a threshold value.

Yet another embodiment decomposes the distribution of differences into a portion of the distribution and a remaining portion of the distribution. Decomposing the distribution of differences into the portions may be based on, for example, differences that are less than or equal to a time of one second and differences that are greater than the time of one second. The indicator of false answer supervision is a ratio of the portion of the distribution to the remaining portion of the distribution. False answer supervision is detected, in an event the ratio of the portion of the distribution to the remaining portion of the distribution is greater than a threshold value.

Still yet another embodiment removes the subject route from being provided for completing calls in response to detecting false answer supervision.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Where there are multiple destination carriers (or service providers/vendors) capable of completing a call from a customer to a destination, the selection of a particular destination carrier may be based on one or more considerations including the cost of completing the call through the destination carriers, the quality of service offered by the destination carriers, or other considerations. The destination carrier may be selected according to other business rules including, for example, an agreed upon volume or percentage of traffic to be completed through a carrier in a geographic region. For instance, there may be an agreement between a system operator, such as a wholesaler, and the destination carrier that calls for the system operator to make minimum daily/monthly/yearly payments to a destination carrier in exchange for the destination carrier providing a predetermined number of minutes of service. In those circumstances, the system operator would want to make sure that the destination carrier is used to place calls for at least the predetermined number of minutes each day/month/year before routing calls to other destination carriers to ensure that the system operator derives the maximum amount of service from the destination carrier in exchange for the minimum guaranteed payment. Business rules taking onto account these and other similar types of considerations could then be used to determine which destination carrier to use.

IBASIS, a system operator, is one of the largest carriers of international voice traffic in the world. In addition to global voice termination, IBASIS provides innovative mobile data services and prepaid calling services. Through its innovative quality routing and quality management technologies, IBASIS is able to select the best available route for every call. IBASIS Network Operations Centers (NOCs) combine state-of-the-art network management technology with around-the-clock dedicated technicians to ensure the highest quality of service to customers worldwide.

False answer supervision causes customers to complain about extra billing of calls, e.g., billing incomplete calls or billing for more time than actually used. Responding to false answer supervision complaints consumes a great deal of resources for system operators like IBASIS. Using information provided by customers in false answer supervision complaints or trouble tickets, false answer supervision can be detected by placing calls to fake numbers that should not connect and seeing if the calls are billed as connected calls. This is reactive false answer supervision detection because detection relies on customers first complaining of a problem. As an indicator of false answer supervision, reacting to customer complaints is wholly inadequate because not every customer complains. Further, false answer supervision tends to be a transient problem, often disappearing before one can react to the problem, only to reappear at a later time and/or location in a system operator's network like the IBASIS Global Network.

In contrast, detecting false answer supervision in a proactive manner addresses these and other deficiencies, but is much harder to execute. False answer supervision is not always malicious in nature. Simple network malfunctions, as well as equipment malfunctions and configuration issues, can also cause isolated cases of false answer supervision. For example, false answer supervision may be experienced when there is no synchronization between a voice over internet protocol (VoIP) leg and public switched telephone network (PSTN) leg of a call on a VoIP-to-PSTN gateway. When the call reaches the gateway from the VoIP network, the gateway attempts to establish a connection, but due to incorrect configuration, the gateway detects the states of the call that are advertised by the PSTN network (e.g., "called party ringing," and "called party connected"). In this case the gateway forces the "CONNECT" state. The gateway connects the call and begins billing according to settings for the gateway and not according to the actual state of the call.

False answer supervision is even harder to detect proactively because some vendors of routes (i.e., vendors or service providers that complete calls from customers to destinations) only apply fraud-based false answer supervision to a small percentage of traffic or calls. There are also services available to vendors to exploit false answer supervision and increase their profits. One such service stimulates calls to numbers that are out of mobile network coverage and provides false billable airtime to a calling party. This service pretends to be a real mobile carrier and plays back real mobile carrier service messages (e.g., "the number you are calling is not reachable at the moment, please, call back later") while charging the calling party.

Figure 1:
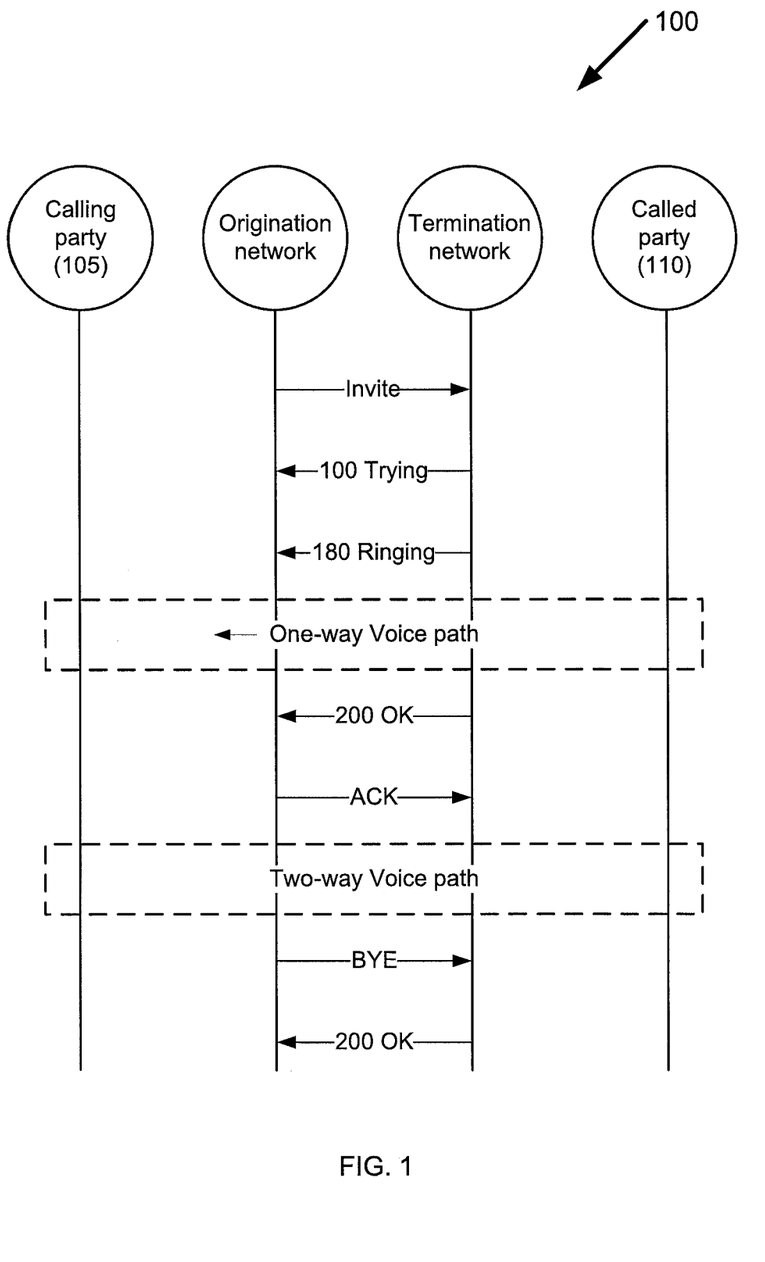
FIG. 1 is a signaling diagram of an example callflow.

In FIG. 1, an example callflow 100 from a calling party 105 to a called party 110, illustrates signaling-based answer supervision. The calling party 105 and the called party 110 exchange signals or messages 115 to set up a voice path or call between themselves. In this example, the exchanged signals 115 are session initiation protocol (SIP) messages, but could also be H.323 messages or messages of other signaling protocols. The "200 OK" SIP message, in particular, marks a time to start billing the calling party 105.

The calling party 105 experiences a false answer supervision problem and is erroneously billed for a call when the called party 110 is still ringing or when the calling party 105 still hears an announcement play (e.g., network announcement or message of "your call cannot be completed as dialed"), even when the call is connected with the "200 OK" message present in the callflow 100. The calling party 105 also experiences a false answer supervision problem and is overbilled for a call when billing starts at the "200 OK" message present on the callflow 100 when the called party 110 has still not answered the phone. After the called party 110 answers the phone and talks for some time, the calling party 105 is overbilled. As described above, the calling party 105 may experience a false answer supervision problem for a number of reasons, including fraud.

Figure 2:
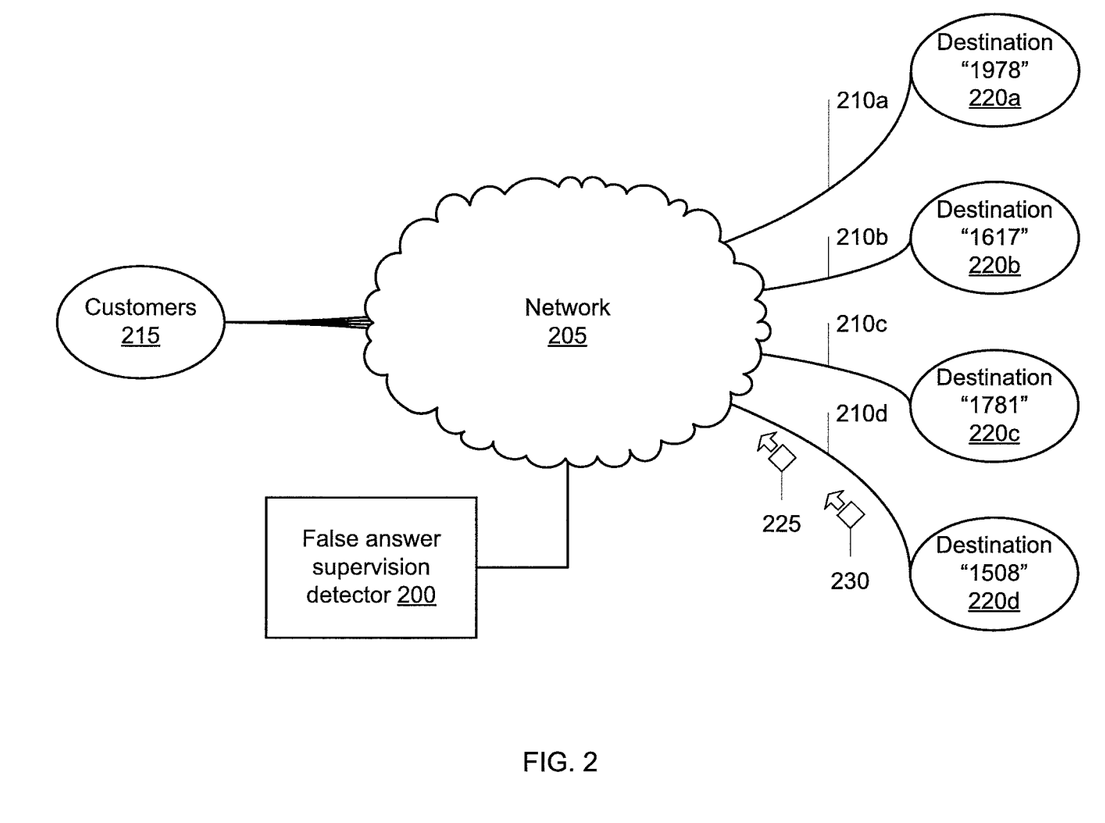
FIG. 2 is a network diagram of an example network in which embodiments of the present invention may be employed.

In FIG. 2, a false answer supervision detector 200 is communicatively coupled to a network 205 that has routes 210a . . . 210d (generally 210) for completing calls by customers 215 to destinations 220a . . . 220d (generally 220), such as the area codes 1978, 1781, 1508, and 1617.

One or more service providers or vendors provide the routes 210. For example, a first vendor and second vendor may both provide the route 210a to the "1978" destination 220a. Accordingly, false answer supervision is a problem that is particular to a combination of vendor and route (referred to also as, vendor/route combination). However, for the sake of readability and for discussing the embodiments, this disclosure refers to false answer supervision as being for a route, on a route or otherwise as a false answer supervision route.

There may be portions of the route 210. A vendor may provide each portion making up the route 210. Alternatively, more than one vendor may provide the portions making up the route 220, in which case, each vendor provides at least a portion of the route 210. As such, false answer supervision may be for a portion of the route 210.

The route 210 may be characterized by measures, such as number of completed calls, number of attempted calls (i.e., completed calls+hangups), and duration of calls. The route 210 may also be characterized by measures of quality or quality metrics, such as answer-seizure ratio (i.e., ASR=number of call attempts answered/number of call attempts, where the number of call attempts is a number of calls a business (or provider) chooses to handle and tries to terminate and the number of call attempts answered is a number of calls the business (or provider) chooses to handle and does terminate, the ASR is also referred to as a Call Completion Rate or Ratio) and Average Call Duration (i.e., ACD=total duration of calls/total number of completed calls, where the number of completed calls is a number of calls a business (or provider) is able to terminate and generate revenue, also referred to as "Connects"). Other quality metrics measured may include Decline-to-Offer Ratio (i.e., DTO=number of declined calls/number of offers, where the number of offers is a number of individual calls transmitted from business to business. i.e., from offerer to offeree, in the telecom wholesale industry, and the number of declined calls is a number of calls the offeree chooses not to handle and "declines" back to the offerer).

For carrying calls (voice, fax or data) between the customers 215 and the destinations 220, the route 210 also carries signals or messages used to complete the calls, such as alerting/ringing signal 225 (e.g., "180 Ringing" SIP message of FIG. 1), also referred to as an alert signal, and connect signal 230 (e.g., "200 OK" SIP message of FIG. 1). A difference between a timestamp of the alert signal 225 and a timestamp of the connect signal 230 still further characterizes the route 210.

Figure 3:
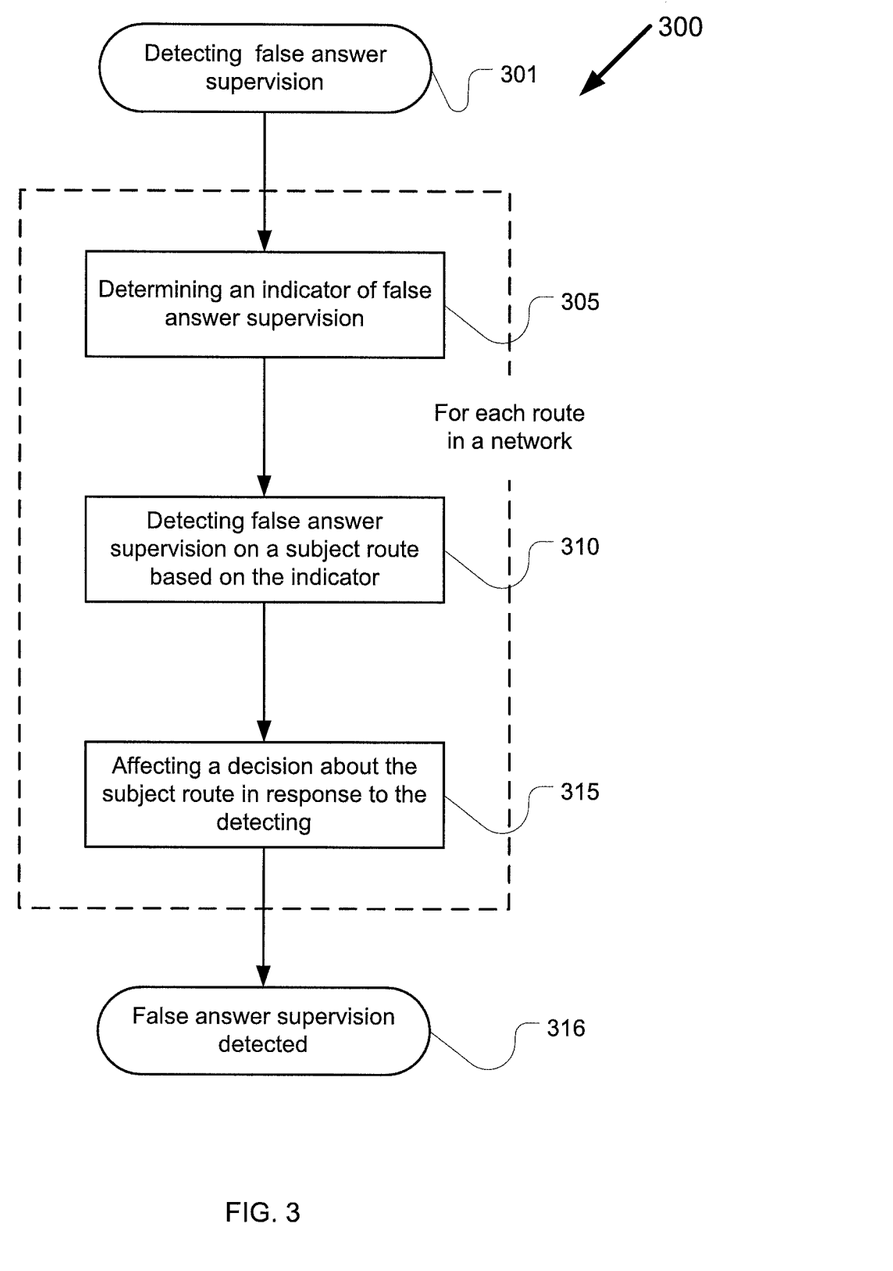
FIG. 3 is a flowchart of an example process for detecting false answer supervision, in accordance with an example embodiment of the present invention.

In FIG. 3, an example process 300 for detecting false answer supervision is executed by a false answer supervision detector, such as the false answer supervision detector 200 of FIG. 2. The process 300 starts (301).

The process 300, for each route, determines (305) an indicator of false answer supervision as either: i) a function of a number of completed calls of short duration and a number of hangups or ii) a function of a distribution of differences between timestamps of alert signals and timestamps of connect signals used to complete calls.

The process 300 detects (310) false answer supervision for at least a portion of a subject route based on the indicator of false answer supervision so determined by either functions separately or in combination. For example, detecting false answer supervision may be based on a first indicator of false answer supervision together with a second indicator of false answer supervision. The first indicator is determined as the function of the number of completed calls of short duration and the number of hangups. The second indicator of false answer supervision is determined as the function of the distribution of differences between the timestamps of alert signals and the timestamps of connect signals used to complete the calls. Detecting false answer supervision based on the first and second indicators may be used in situations in which false answer supervision is not or cannot be detected with one of the indicators, but is or can be detected with the other indicator. For example, calls of long duration (e.g., 5-10 minutes) that are overbilled by several seconds before actually connecting can be detected using at least one of the indicators described above. This improves the ability of the process 300 to detect false answer supervision.

Detecting false answer supervision based on the first and second indicators may also be used to verify or cross-check false answer supervision detection using one indicator against detection using the other indicator. This improves the accuracy of the process 300 to detect false answer supervision.

The process 300 affects (315) a decision about the subject route in response to the detecting (310). One embodiment removes the subject route from being provided for completing calls in response to detecting false answer supervision. The route, more specifically, the vendor/route combination is scrubbed from a routing lineup. Another embodiment reduces a number of calls to be completed by the subject route. The route, more specifically, the vendor/route combination may be placed under probation.

The process 300 ends (316) with false answer supervision detected.

A convenient embodiment determines the indicator for false answer supervision as a ratio of the number of completed calls of short duration to the number of hangups, also referred to as a call duration-based false answer supervision ratio. False answer supervision is detected if the call duration-based false answer supervision ratio exceeds a threshold. The threshold to which to compare the call duration-based false answer supervision ratio against may be set or otherwise established in several ways as will be described in detail later.

The number of completed calls of short duration and the number of hangup are chosen for the call duration-based false answer supervision ratio because a false answer supervision route (i.e., false answer supervision for a particular vendor/route combination) has a high percentage of short duration calls and a low percentage of calls that are hung up by a calling party. The call duration-based false answer supervision ratio measures or otherwise indicates, for example, the ability to hang up a call that cannot be completed.

The call duration-based false answer supervision ratio is contrasted with an answer seizure ratio (ASR), which is a ratio of a number of completed calls to a number of attempted calls. Unlike the disclosed call duration-based false answer supervision ratio, the answer seizure ratio does not consider the relationship between hangups and calls of short duration. In fact, in the definition of ASR, calls of short duration are not represented and separated from other calls (e.g., calls of long duration). In the definition of call duration-based false answer supervision ratio, however, calls of short duration are represented and separated from other calls. The call duration-based false answer supervision ratio considers both the duration of completed calls and attempted calls that hung up to remove the "noise" that makes it difficult to detect false answer supervision with the answer seizure ratio. Further, in the presence of false answer supervision, both the number of completed calls of short duration and the number of hangups change simultaneously. The call duration-based false answer supervision ratio may be said to have increased sensitivity and responsivity for detecting a false answer supervision route.

The following example illustrates the increased sensitivity and responsivity of the call duration-based false answer supervision ratio over the conventional measures of quality, ASR and ACD. In a FAS-free environment, an ASR=60/100=0.6, in which 60 is the number of completed call, among which there are 5 calls that lasted less than 15 seconds, 100 is the number of attempted calls, hence, 100−60=40 calls are hangups. In this environment, an ACD=300/60=5, in which 300 is the total call minutes and 60 is number of completed calls.

Changing to a FAS environment, in which some of the 40 hangups (e.g., assume 20) are treated as short completed calls, each lasting 15 seconds or 0.25 minutes, all other things stay unchanged. In this FAS environment, an ASR=(60+20)/100=0.8, in which 20 is the number of completed calls that should be hangups really, and an ACD=(300+20*0.25)/60+20)=3.8. So between the FAS-free and FAS environments, the only difference is in the FAS environment in which 20 calls should be hangups, but are treated as completed calls. This difference is reflected as a 33% relative increase in ASR and 24% relative reduction in ACD in the FAS environment as compared to the FAS-free environment, as shown in the chart below.

|  | FAS-free | FAS | Relative Change in Percentage |
| --- | --- | --- | --- |
| ASR | 0.6 | 0.8 | (0.8 − 0.6)/0.6 = 33% |
| ACD | 5 | 3.8 | (3.8 − 5)/5 = −24% |

In the FAS environment, the 33% increase in ASR and 24% reduction in ACD may sound like a large change, but the normal fluctuation of ASR and ACD in the telecom wholesale industry is within the same range. As such, it is difficult to detect an indication of false answer supervision using ASR and ACD.

In contrast using the call duration-based false answer supervision ratio (FASR), an indication of false answer supervision becomes very sensitive to being detected. In a FAS-free environment, as FASR=5/40=0.125, in which 5 is the number of calls that lasted less than 15 seconds and 40 is the number of hangups (i.e., number of attempted calls−completed call). Changing to the FAS environment, 20 more calls are treated as short completed calls (e.g., lasting 15 seconds or less) and a FASR=(5+20)/(40−20)=1.25 Changing from the FAS-free environment to the FAS environment there is 900% relative increase in FASR, as shown in the chart below:

|  | FAS-free | FAS | Relative Change in Percentage |
| --- | --- | --- | --- |
| FASR$_{call-duration}$ | 5/40 = 0.125 | (5 + 20)/(40 − 20) = 1.25 | (1.25 − 0.125)/0.125 = 900% |

A 900% change in a metric is highly distinguishable. As such, the FAS environment can easily be detected using the call duration-based false answer supervision ratio.

Returning to FIG. 2, the false answer supervision detector 200, itself, collects, directly, the number of completed calls of short duration and the number of hangups to determine the call duration-based false answer supervision ratio. Alternatively, the false answer supervision detector 200 collects, indirectly, the number of completed calls of short duration and the number of hangups from other nodes in the network 205. Whether the false answer supervision detector 200 collects directly or indirectly dictates how the false answer supervision 200 interfaces with or otherwise is communicatively coupled to the network 205 both physically and logically.

A convenient embodiment excludes from a number of completed calls, a number of completed calls of long duration to yield or otherwise derive the number of completed calls of short duration. The embodiment further excludes from a number of attempted calls, the number of completed calls to yield the number of hangups. The embodiment collects the number of completed calls and/or the number of attempted calls either directly or indirectly as described above.

Another embodiment excludes completed calls with durations greater than a time of 15 seconds from the number of completed calls to yield or otherwise derive the number of completed calls of short duration. In this embodiment, a completed call of short duration is defined as a completed call that lasts for 15 seconds or less. A completed call of long duration is defined as a completed call that lasts for more than 15 seconds. This is but one example definition of completed calls of short duration and completed calls of long duration. Short duration and long duration may be defined based on empirical data. For example, research shows that calls that should be hung up, yet are experiencing false answer supervision, do not last longer than some measure of time.

In this instance, completed calls of short duration are defined as completed calls that last no longer than a time that is discovered from research. Completed calls of long duration are defined as completed calls that last for more than the discovered time.

Still another embodiment varies sensitivity for detecting false answer supervision by varying the number of completed calls of long duration that are excluded. The embodiment excludes completed calls with durations greater than a time of variable length. The sensitivity varies in response to varying the number of completed calls of long duration that are excluded.

Figure 4:
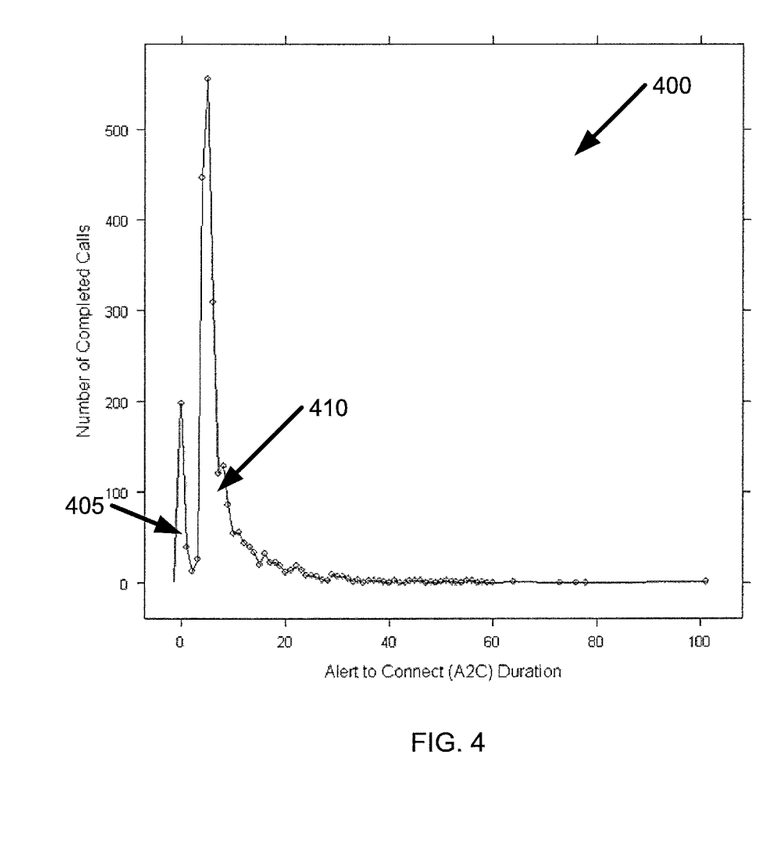
FIG. 4 is chart of a distribution of differences between timestamps of alert messages and timestamps of connect messages.

FIG. 4 charts a distribution 400 of differences between timestamps of alert messages (e.g., the alert message 225 of FIG. 2) and timestamps of connect messages (e.g., the connect message 230 of FIG. 2) against a number of completed calls. The difference, also referred to as alert-to-connection (A2C) duration, is the time from when a calling party's phone starts to ring (i.e., time of an alert message) to when the called party answers the phone (i.e., time of a connect message).

In the distribution 400, for some calls the time of the alert message and the time of the connect message are nearly identical e.g., the difference is substantially zero. It is highly improbable for a phone to be answered as soon as it starts to ring. Usually there is a difference of 2 to 10 seconds from when the phone starts to ring to when the phone is answered. A convenient embodiment decomposes the distribution 400 into a portion 405 and a remaining portion 410. The embodiment determines an indicator of false answer supervision as a ratio of the portion 405 to the remaining portion 410, also referred to as a signaling-based false answer supervision ratio.

False answer supervision is detected if the signaling-based false answer supervision ratio exceeds a threshold. The threshold to which to compare the signaling-based false answer supervision ratio against may be set or otherwise established in several ways as will be described in detail later.

There may be several bases for decomposition. One embodiment decomposes the distribution 400 into a portion of differences less than or equal to one second and a remaining portion of differences greater than one second.

Still another embodiment varies sensitivity for detecting false answer supervision by varying the portion of the distribution and the remaining portion of the distribution that are decomposed. The embodiment decomposes the distribution into a portion of the distribution of differences less than or equal to a time of variable length and a remaining portion of the distribution of differences greater than the time of variable length.

The time of variable length can be selected empirically because usually false answer supervision (or a false connect signal) starts within the first few seconds after the alert signal. In most cases, false answer supervision starts immediately within 1 second after the alert signal. Setting the time of variable length to another value, such as 5 seconds, enables an embodiment to catch or otherwise detect false answer supervision (or a false connect signal) as long as false answer supervision starts within 5 seconds of the alert signal.

The sensitivity varies in response to varying the portion of the distribution and the remaining portion of the distribution.

The embodiments may collect the timestamps of alert messages and the timestamps of connect messages directly or indirectly, similar to collecting the number of completed calls of short duration and the number of hangups described above.

As described earlier, false answer supervision is detected if the call duration-based false answer supervision ratio, the signaling-based false answer supervision ratio or a combination thereof (described in reference to FIG. 3), exceeds a threshold. For the sake of readability, in the discussion below, a false answer supervision ratio generally refers to the call duration-based false answer supervision ratio, the signaling-based false answer supervision ratio, and the combination thereof. The threshold against which to compare the false answer supervision ratio, may be set or otherwise established in several ways.

The threshold may be set as or set as part of a business rule. For instance, there may be a business agreement between a system operator, such as a wholesaler, and a vendor of routes that the vendor agrees not to provide a route or routes having a false answer supervision ratio that exceeds a threshold. As described previously, because more than one vendor may provide a route to a destination, false answer supervision is a problem particular to a vendor/route combination. Accordingly, for a given route, different vendors can agree to provide the route with a false answer supervision ratio that does not exceed different thresholds. For example, a first vendor agrees to provide the route with a false answer supervision ratio that does not exceed a first threshold. For the same route, a second vendor agrees to provide the route with a false answer supervision ratio that does not exceed a second threshold that is different from the first threshold.

Such a route provided by different vendors agreeing not to exceed different thresholds may be offered or otherwise sold to customers as having different levels of assurance of being without false answer supervision or "FAS free." For example, a customer may pay to make its call with "gold," "silver," or "bronze" (or other distinguishing labels) level of "FAS free" guarantee. These levels correspond with a first vendor agreeing not to exceed a first threshold, a second vendor agreeing not to exceed a second threshold, and a third vendor agreeing not to exceed a third threshold. The first threshold is less than the second threshold, and the second threshold is less than the third threshold.

The threshold may be set based on false answer supervision ratios from a number of vendors of a particular route, a number of routes of a particular vendor, or a combination thereof.

For example, the threshold is set as the mean (or other value that represents a set of values) of the false answer supervision ratios.

The threshold may be set to accommodate regional network behavior. Some countries or combinations of vendor and country (or region) (also referred to as vendor/country combinations) exhibit a behavior that is detected, typically, as fraud, for example, not billing for calls that enter voice mail. Different thresholds may be set for different vendor/country combinations to adhere to and not to exceed, rather than assuming all vendors should display similar behavior or tendencies.

False answer supervision ratios may be determined over a period of time, such as 30 days. The mean false answer supervision ratio and standard deviation may then be calculated from the collected ratios. False answer supervision is detected if when the current false answer supervision ratio exceeds an upper control limit that is calculated according to a statistical process control method: mean(false answer supervision ratio)+n_sigma*standard deviation (false answer supervision ratio).

Figure 5:
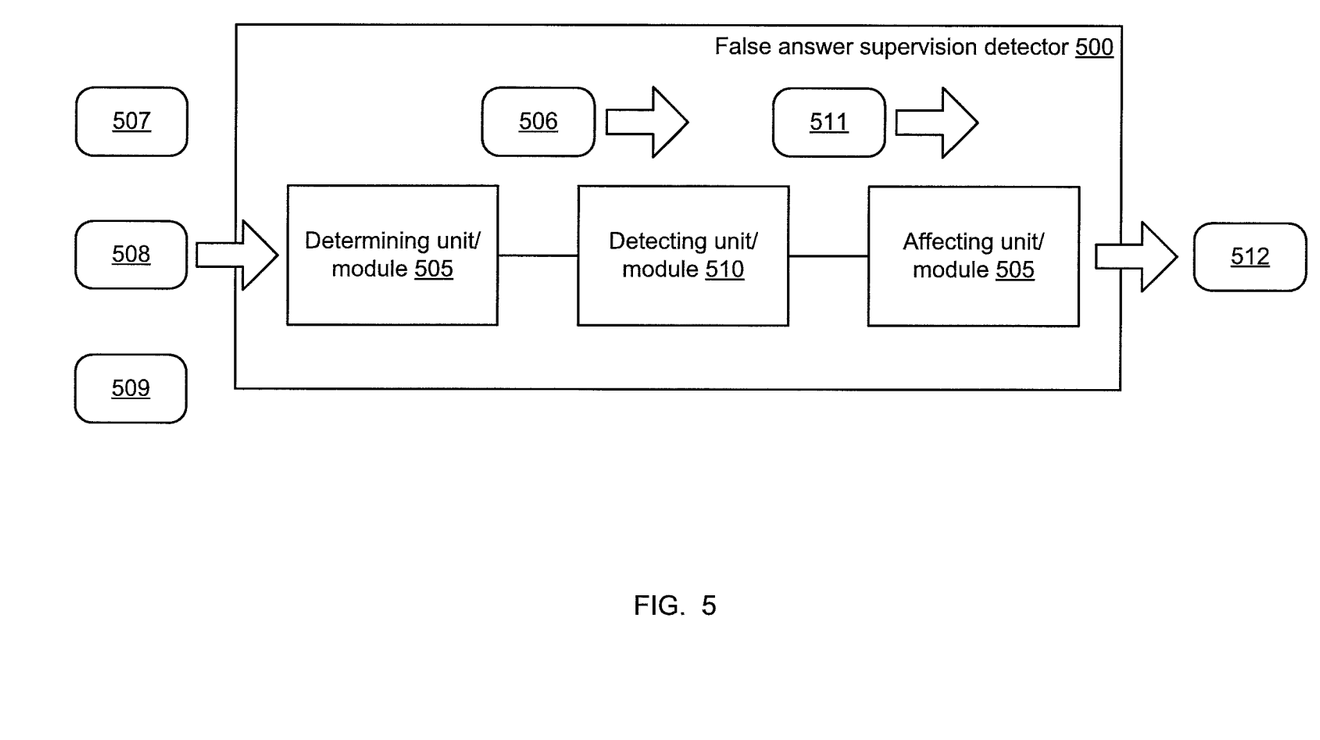
FIG. 5 is a block diagram of example apparatus to detect false answer supervision, in accordance with an example embodiments of the present invention.

In FIG. 5, an example false answer supervision detector 540 to detect false answer supervision includes a detecting unit/module 505, detecting unit/module 510, and affecting unit/module 515, each communicatively coupled from one to another.

The determining unit/module 505 determines for each route, an indicator of false answer supervision 506 as either: i) a function of a number of completed calls of short duration 507 and a number of hangups 508 or ii) a function of a distribution of differences 509 between timestamps of alert signals and timestamps of connect signals used to complete calls.

The detecting unit/module 510 detects false answer supervision for at least a portion of a subject route based on the indicator of false answer supervision 506 so determined by either functions separately or in combination.

Responsive to a response 511 from the detecting unit/module 510, the affecting unit/module affects a decision 512 about the subject route. For example, the decision to remove or otherwise scrub the offending route (more particularly, the vendor/route combination) or put the offending route on probation and provide it to fewer customers to use.

The false answer supervision detector 500 and its components (viz., the unit/modules 505, 510, and 515) may be configured or otherwise adapted for the specific purpose of detecting false answer supervision. For example, the determining unit/module 505 is configured to determine an indicator of false answer supervision. The detecting unit/module 510 is configured to detect false answer supervision based on the indicator. And the affecting unit/module 515 is configured to affect a decision about a subject route in response to false answer supervision being detected.

Alternatively, the false answer supervision detector 500 may be a general purpose computer having a processor, memory, communication interface, etc. The general purpose computer is transformed into the false answer supervision detector 500 and its components, for example, by loading instructions into the processor that cause the computer to determine an indicator of false answer supervision, to detect false answer supervision based on the indicator, and to affect a decision about a subject route in response to false answer supervision being detected.

Figure 6:
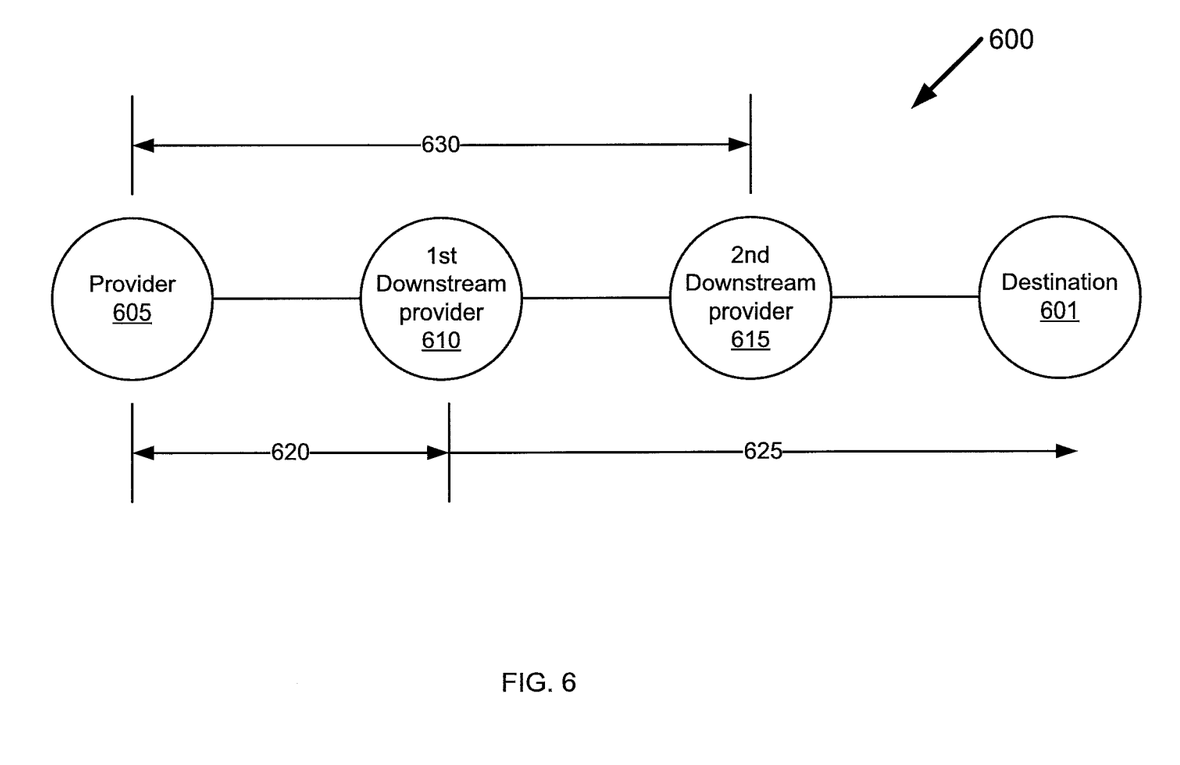
FIG. 6 is a route diagram of an example route in which embodiments of the present invention may be employed.

FIG. 6 illustrates an example route 600 to a destination 601 provided by a provider 605, first downstream provider 610, and second downstream provider 615. For discussion purposes, the term "downstream," describes a direction towards the destination 601, away from the provider 605. For example, in the route 600, the first downstream provider 610 is downstream from the provider 605.

Each of the providers 605, 610, and 615 provides a portion of the route 600. Between the provider 605 and the first downstream provider 610 is a portion 620 of the route 600. Continuing downstream from the first downstream provider 610 is another portion 625 of the route 600. The other portion 625 includes the destination 601, the first downstream provider 610, and the second downstream provider 615.

An embodiment determines for the portion 620 an indicator of false answer supervision. The embodiment determines the indicator of false answer supervision as either: i) a function of a number of completed calls of short duration and a number of hangups or ii) a function of a distribution of differences between timestamps of alert signals and timestamps of connect signals used to complete calls. The embodiment then detects a false answer supervision portion 630 of the route 600 based on: i) the indicator of false answer supervision for the portion 620, and ii) a result of detecting false answer supervision for the other portion 625.

The result of detecting false answer supervision for the other portion 625 may be generated by a technique different from one used in the present embodiment. For example, false answer supervision is detected in a reactive manner in response to customer complaints of false answer supervision, as described previously.

The embodiment then removes the false answer supervision portion 630 from the route 600.

The false answer supervision portion 630 may be the portion 620 based on the indicator of false answer supervision determined for the portion 620 and the false answer supervision result detected for the other portion 625. For example, if false answer supervision is detected for the portion 620 and not for the other portion 625, then the portion 620 is the false answer supervision portion 630. As illustrated in FIG. 6, the false answer supervision portion 630 may span more than one portion. The false answer supervision portion 630 may even span every portion of the route 600, i.e., the entire route 600 may be the false answer supervision portion 630.

A convenient embodiment directs the provider 605 to determine at the provider 605, the indicator of false answer supervision for the portion 620. The embodiment directs the provider 605 to determine the indicator of false answer supervision as either: i) a function of a number of completed calls of short duration and a number of hangups or ii) a function of a distribution of differences between timestamps of alert signals and timestamps of connect signals used to complete calls. One skilled in the art will readily recognize that the foregoing is not intended to be limited to a particular implementation, but may be implemented in a variety of ways. For example, the embodiment directs the provider using signals or messages.

Another embodiment directs the first downstream provider 610 to determine at the first downstream provider 610, another indicator of false answer supervision in substantially the same manner as the provider 605. The embodiment then detects the false answer supervision portion 630 based on: i) the indicator of false answer supervision for the portion 620 between the provider 605 and the first downstream provider 610, and ii) the other indicator of false answer supervision for the other portion 625 that continues downstream from the first downstream provider 610.

Yet another embodiment identifies a false answer supervision provider of the false answer supervision portion 630. In the example illustrated in FIG. 6, the false answer supervision portion 630 (i.e., the portion of the route 600 for which false answer supervision is detected) includes the provider 605, the first downstream provider 610, and the second downstream provider 615. The providers 605, 610, and 615 may each be contributing to the false answer supervision that is detected. False answer supervision, however, is not detected downstream of the second provider 615. As such, at the very least, the second provider 615 is contributing false answer supervision. The embodiment identifies the second provider 615 as the false answer supervision provider of the false answer supervision portion 630. The second downstream provider/false answer supervision provider 615 is a root cause or source of false answer supervision for the route 600. The embodiment removes the second downstream provider/false answer supervision provider 615 from the route 600.

After removing a false answer supervision provider, the embodiment repeats the foregoing (viz., i) determining an indicator of false answer supervision for a portion of a route, ii) detecting a false answer supervision portion based on the indicator and a result of detecting false answer supervision for another portion of the route, iii) identifying a false answer supervision provider for the false answer supervision portion, and iv) removing the false answer supervision provider) until false answer supervision is not detected. As such, the embodiment addresses the problem of multiple providers contributing to false answer supervision for a route.

Recall that in addition to false answer supervision caused by fraud (i.e., malicious false answer supervision) false answer supervision can be due to configuration errors. Identifying the false answer supervision provider or root cause of false answer supervision, in a manner as described above, can be used to troubleshoot such errors.

Because multiple providers can provide portions of a route and thus, can contribute to false answer supervision, detecting false answer supervision for the route is envisioned to be a "community" effort. Each provider detects false answer supervision for a respective portion of the route provided, for example, using the process 300 of FIG. 3. False answer supervision is detected based on the result of each provider detecting false answer supervision.

To enable this community effort, the inventive concepts and principles described herein may be embodied in an industry or engineering standard. For example, in such a standard, a provider detects false answer supervision for a portion between the provider and a downstream provider in the manner described above. In an event the provider detects false answer supervision, the downstream provider then tries to detect false answer supervision for portion between it and a provider downstream from it. Typically, a provider (e.g., the provider 605 of FIG. 6) is aware of a downstream provider (e.g., the first downstream provider 610 of FIG. 6), but is not aware of a provider that is further downstream (e.g., the second downstream provider 615 of FIG. 6).

The foregoing continues in a recursive manner resulting in a "chain of false answer supervision." The chain ends when a provider does not detect false answer supervision. The provider at the end of the false answer supervision chain is a root or source of false answer supervision and is removed. Because there may be more than one source of false answer supervision to be removed, detecting false answer supervision may be repeated, as described, until false answer supervision is not detected.

Figure 7:
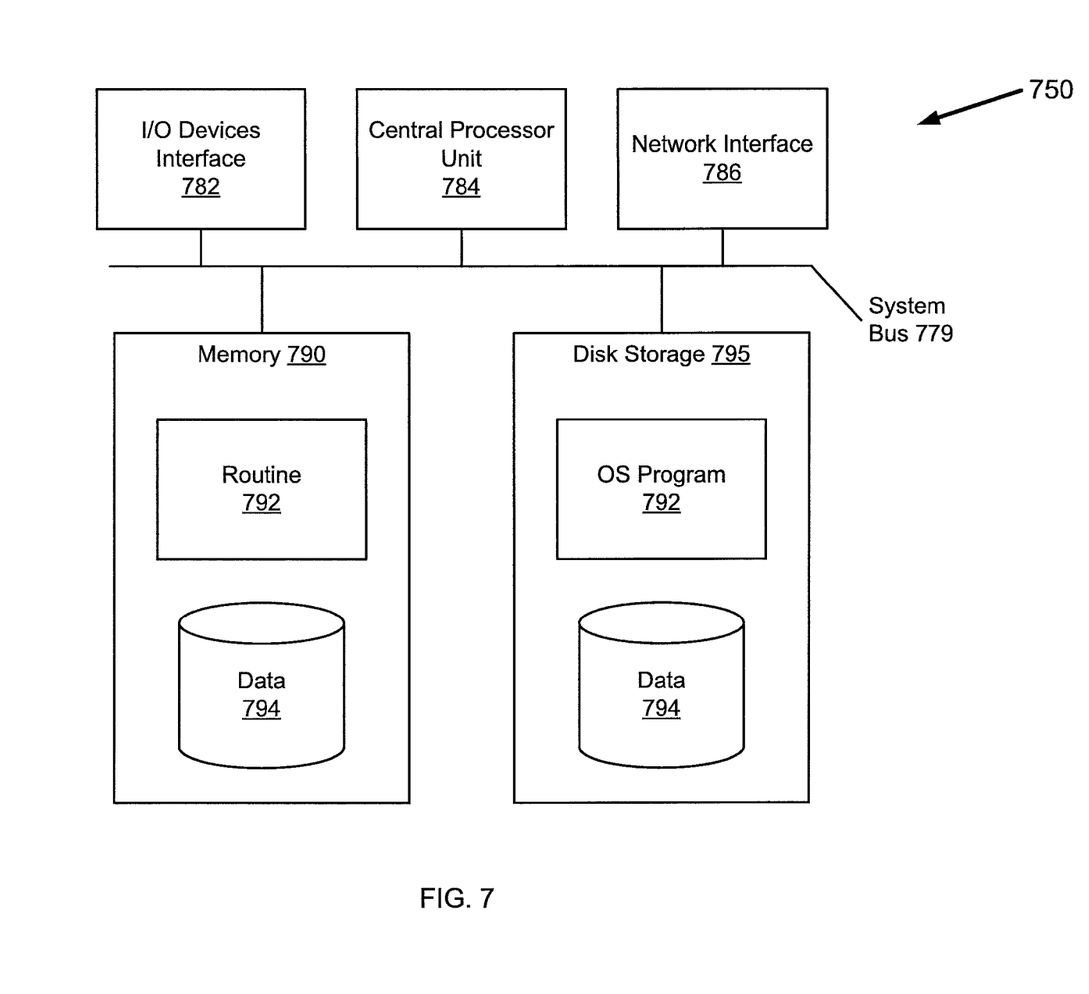
FIG. 7 is an example computer implementing embodiments of the present the present invention.

FIG. 7 is a block diagram of the internal structure of a computer 750 in which various embodiments of the present invention may be implemented. The computer 750 contains system bus 769, where a bus is a set of hardware lines used for data transfer among the components of a computer or processing system. Bus 769 is essentially a shared conduit that connects different elements of a computer system (e.g., processor, disk storage, memory, input/output ports, network ports, etc.) that enables the transfer of information between the elements. Attached to system bus 769 is I/O device interface 782 for connecting various input and output devices (e.g., keyboard, mouse, displays, printers, speakers, etc.) to the computer 750. Network interface 786 allows the computer 750 to connect to various other devices attached to a network. Memory 790 provides volatile storage for computer software instructions 792 (e.g., instructions for the process 300 of FIG. 3 for detecting false answer supervision) and data 794 used to implement an embodiment of the present invention. Disk storage 795 provides non-volatile storage for computer software instructions 792 and data 794 used to implement an embodiment of the present invention. Central processor unit 784 is also attached to system bus 769 and provides for the execution of computer instructions.

In one embodiment, the processor routines 792 (e.g., instructions for the process 300 of FIG. 3 for detecting false answer supervision) and data 794 are a computer program product (generally referenced 792), including a computer readable medium (e.g., a removable storage medium such as one or more DVD-ROM's, CD-ROM's, diskettes, tapes, etc.) that provides at least a portion of the software instructions for the invention system. Computer program product 792 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 7 is for purposes of illustration and not limitation of the present invention.

While example embodiments have been particularly shown and described, it will be understood by those skilled in the art that various changes in form and details may be made therein without departing from the scope encompassed by the appended claims.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method executed by a false answer supervision detector, which is communicatively coupled to a network that has at least one route provided for completing calls by customers, for detecting false answer supervision, the method comprising:

determining for each route an indicator of false answer supervision as either: i) a function of a ratio of a number of completed calls of short duration to a number of hangups, the ratio determined by excluding from a number of completed calls, a number of completed calls of long duration to yield the number of completed calls of short duration and excluding from a number of attempted calls, the number of completed calls to yield the number of hangups or ii) a function of a distribution of differences between timestamps of ringing signals and timestamps of connect signals used to complete calls;

detecting false answer supervision for a subject route based on the indicator of false answer supervision so determined by either functions separately or in combination; and affecting a decision about the subject route in response to the detecting.

2. The method of claim 1 wherein false answer supervision is detected, in an event, the ratio of the number of completed calls of short duration to the number of hangups is greater than a threshold value.

3. The method of claim 1 wherein excluding the number of completed calls of long duration includes excluding completed calls with durations greater than a time of 15 seconds.

4. The method of claim 1 wherein excluding the number of completed calls of long duration includes varying the number of completed calls of long duration that are excluded by excluding completed calls with durations greater than a time of variable length; and wherein detecting includes varying a sensitivity for detecting false answer supervision in response to varying the number of completed calls of long duration that are excluded from the number of completed calls.

5. The method of claim 1 wherein determining includes decomposing the distribution into a portion of the distribution and a remaining portion of the distribution, the indicator of false answer supervision being a ratio of the portion of the distribution to the remaining portion of the distribution; and wherein false answer supervision is detected, in an event, the ratio of the portion of the distribution to the remaining portion of the distribution is greater than a threshold value.

6. The method of claim 5 wherein decomposing includes decomposing the distribution into a portion of the distribution of differences less than or equal to a time of one second and a remaining portion of the distribution of differences greater than the time of one second.

7. The method of claim 5 wherein decomposing includes varying the portion of the distribution and the remaining portion of the distribution by decomposing the distribution into a portion of the distribution of differences less than or equal to a time of variable length and a remaining portion of the distribution of differences greater than the time of variable length; and wherein detecting includes varying a sensitivity for detecting false answer supervision in response to varying the portion of the distribution and the remaining portion of the distribution.

8. The method of claim 1 wherein affecting the decision about the subject route includes removing the subject route from being provided for completing calls in response to detecting false answer supervision.

9. The method of claim 1 wherein affecting the decision about the subject route includes reducing a number of calls to be completed by the subject route.

10. The method of claim 1 wherein the subject route is provided by a provider and at least one downstream provider, each provides a portion of the subject route;

wherein determining includes determining for a portion of the subject route between the provider and the at least one downstream provider an indicator of false answer supervision as either: i) a function of a number of completed calls of short duration and a number of hangups or ii) a function of a distribution of differences between timestamps of ringing signals and timestamps of connect signals used to complete calls;

wherein detecting includes detecting a false answer supervision portion of the subject route based on: i) the indicator of false answer supervision for the portion of the subject route between the provider and the at least one downstream provider so determined by either functions separately or in combination, and ii) a result of detecting false answer supervision for an other portion that continues downstream from the at least one downstream provider; and wherein affecting includes removing the false answer supervision portion from the subject route.

11. The method of claim 10 wherein determining includes directing the provider to determine at the provider, the indicator of false answer supervision for the portion of the subject route between the provider and the at least one downstream provider, the provider is directed to determine the indicator of false answer supervision as either: i) a function of a number of completed calls of short duration and a number of hangups or ii) a function of a distribution of differences between timestamps of ringing signals and timestamps of connect signals used to complete calls.

12. The method of claim 11 further comprising directing the downstream provider to determine at the downstream provider, an other indicator of false answer supervision in substantially the same manner as the provider, the other indicator of false answer supervision is determined for the other portion of the subject route that continues downstream from the at least one downstream provider; and wherein detecting includes detecting the false answer supervision portion of the subject route based on: i) the indicator of false answer supervision for the portion between the provider and the at least one downstream provider, and ii) the other indicator of false answer supervision for the other portion that continues downstream from the at least one downstream provider.

13. The method of claim 10 further comprising:

identifying a false answer supervision provider of the false answer supervision portion, downstream of the false answer supervision provider false answer supervision is not detected, the false answer supervision provider is a root cause of false answer supervision for the subject route; and removing the false answer supervision provider from the subject route.

14. A false answer supervision detector, which is communicatively coupled to a network that has at least one route provided for completing calls by customers, for detecting false answer supervision, the detector comprising:

a determining unit to determine for each route an indicator of false answer supervision as either: i) a function of a ratio of a number of completed calls of short duration to a number of hangups, the ratio determined by excluding from a number of completed calls, a number of completed calls of long duration to yield the number of completed calls of short duration and excluding from a number of attempted calls, the number of completed calls to yield the number of hangups or ii) a function of a distribution of differences between timestamps of ringing signals and timestamps of connect signals used to complete calls;

a detecting unit communicatively coupled to the determining unit to detect false answer supervision for a subject route based on the indicator of false answer supervision so determined by either functions separately or in combination; and an affecting unit communicatively coupled to detecting unit to affect a decision about the subject route in response to the detecting.

15. The false answer supervision detector of claim 14 wherein false answer supervision is detected, in an event, the ratio of the number of completed calls of short duration to the number of hangups is greater than a threshold value.

16. The false answer supervision detector of claim 14 wherein excluding the number of completed calls of long duration includes excluding completed calls with durations greater than a time of 15 seconds.

17. The false answer supervision detector of claim 14 wherein a first excluding unit varies the number of completed calls of long duration that are excluded by excluding completed calls with durations greater than a time of variable length; and wherein the detecting unit varies a sensitivity for detecting false answer supervision in response to varying the number of completed calls of long duration that are excluded from the number of completed calls.

18. The false answer supervision detector of claim 14 wherein the determining unit decomposes the distribution into a portion of the distribution and a remaining portion of the distribution, the indicator of false answer supervision being a ratio of the portion of the distribution to the remaining portion of the distribution; and wherein false answer supervision is detected, in an event, the ratio of the portion of the distribution to the remaining portion of the distribution is greater than a threshold value.

19. The false answer supervision detector of claim 18 wherein the determining unit decomposes the distribution into a portion of the distribution of differences less than or equal to a time of one second and a remaining portion of the distribution of differences greater than the time of one second.

20. The false answer supervision detector of claim 18 wherein the determining unit varies the portion of the distribution and the remaining portion of the distribution by decomposing the distribution into a portion of the distribution of differences less than or equal to a time of variable length and a remaining portion of the distribution of differences greater than the time of variable length; and wherein the detecting unit varies a sensitivity for detecting false answer supervision in response to varying the portion of the distribution and the remaining portion of the distribution.

21. The false answer supervision detector of claim 14 wherein the affecting unit removes the subject route from being provided for completing calls in response to detecting false answer supervision.

22. The false answer supervision detector of claim 14 wherein the affecting unit reduces a number of calls to be completed by the subject route.

23. The false answer supervision detector of claim 14 wherein the subject route is provided by a provider and at least one downstream provider, each provides a portion of the subject route;

wherein the determining unit determines for a portion of the subject route between the provider and the at least one downstream provider an indicator of false answer supervision as either: i) a function of a number of completed calls of short duration and a number of hangups or ii) a function of a distribution of differences between timestamps of ringing signals and timestamps of connect signals used to complete calls;

wherein the detecting unit detects a false answer supervision portion of the subject route based on: i) the indicator of false answer supervision for the portion of the subject route between the provider and the at least one downstream provider so determined by either functions separately or in combination, and ii) a result of detecting false answer supervision for another portion that continues downstream from the at least one downstream provider; and wherein the affecting unit removes the false answer supervision portion from the subject route.

24. The false answer supervision detector of claim 23 wherein the determining unit directs the provider to determine at the provider, the indicator of false answer supervision for the portion of the subject route between the provider and the at least one downstream provider, the provider is directed to determine the indicator of false answer supervision as either: i) a function of a number of completed calls of short duration and a number of hangups or ii) a function of a distribution of differences between timestamps of ringing signals and timestamps of connect signals used to complete calls.

25. The false answer supervision detector of claim 24 further comprising an other directing unit to direct the downstream provider to determine at the downstream provider, an other indicator of false answer supervision in substantially the same manner as the provider, the other indicator of false answer supervision is determined for the other portion of the subject route that continues downstream from the at least one downstream provider; and wherein the detecting unit includes detects the false answer supervision portion of the subject route based on: i) the indicator of false answer supervision for the portion between the provider and the at least one downstream provider, and ii) the other indicator of false answer supervision for the other portion that continues downstream from the at least one downstream provider.

26. The false answer supervision detector of claim 23 further comprising:

an identifying unit communicatively coupled to the detecting unit to identify a false answer supervision provider of the false answer supervision portion, downstream of the false answer supervision provider false answer supervision is not detected, the false answer supervision provider is a root cause of false answer supervision for the subject route; and a removing unit communicatively coupled to the identifying unit to remove the false answer supervision provider from the subject route.

27. A non-transitory computer readable medium having a computer readable program, wherein the computer readable program when executed on a computer causes the computer to:

determine for each route an indicator of false answer supervision as either: i) a function of a ratio of a number of completed calls of short duration to a number of hangups, the ratio determined by excluding from a number of completed calls, a number of completed calls of long duration to yield the number of completed calls of short duration and excluding from a number of attempted calls, the number of completed calls to yield the number of hangups or ii) a function of a distribution of differences between timestamps of ringing signals and timestamps of connect signals used to complete calls;

detect false answer supervision for a subject route based on the indicator of false answer supervision so determined by either functions separately or in combination; and affect a decision about the subject route in response to the detecting.

28. The method of claim 2 wherein the threshold is set based on false answer supervision ratios from a number of vendors for a particular route, a number of routes for a particular vendor or a combination thereof.

29. The false answer supervision detector of claim 15 wherein the threshold is set based on false answer supervision ratios from a number of vendors for a particular route, a number of routes for a particular vendor or a combination thereof.

30. A method executed by a false answer supervision detector, which is communicatively coupled to a network that has at least one route provided for completing calls by customers, for detecting false answer supervision, the method comprising:

determining for each route a first indicator of false answer supervision as a function of a ratio of a number of completed calls of short duration to a number of hangups and a second indicator of false answer supervision as a function of a distribution of differences between timestamps of ringing signals and timestamps of connect signals used to complete calls;

detecting false answer supervision for a subject route based on the first indicator and the second indicator so determined in combination; and affecting a decision about the subject route in response to the detecting.

31. A method executed by a false answer supervision detector, which is communicatively coupled to a network that has at least one route provided for completing calls by customers, for detecting false answer supervision, the method comprising:

determining for each route an indicator of false answer supervision as a function of a distribution of differences between timestamps of ringing signals and timestamps of connect signals used to complete calls, determining includes decomposing the distribution into a portion of the distribution and a remaining portion of the distribution, the indicator of false answer supervision being a ratio of the portion of the distribution to the remaining portion of the distribution;

detecting false answer supervision for a subject route based on the indicator of false answer supervision so determined, in an event, the ratio of the portion of the distribution to the remaining portion of the distribution is greater than a threshold value; and affecting a decision about the subject route in response to the detecting.

* * * * *